United States Patent
Fukuchi et al.

(10) Patent No.: US 10,011,270 B2
(45) Date of Patent: Jul. 3, 2018

(54) APPARATUS AND METHOD OF CONTROLLING VEHICLE

(71) Applicant: HONDA MOTOR CO., LTD., Tokyo (JP)

(72) Inventors: Masanari Fukuchi, Wako (JP); Ken Kitaori, Wako (JP); Yoshihiro Ito, Wako (JP); Satoshi Matsui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/229,119

(22) Filed: Aug. 5, 2016

(65) Prior Publication Data

US 2017/0036671 A1 Feb. 9, 2017

(30) Foreign Application Priority Data

Aug. 5, 2015 (JP) .................. 2015-155283

(51) Int. Cl.
*B60W 10/26* (2006.01)
*B60W 20/20* (2016.01)
(Continued)

(52) U.S. Cl.
CPC ............. *B60W 20/20* (2013.01); *B60L 1/003* (2013.01); *B60L 3/0061* (2013.01); *B60L 7/14* (2013.01);
(Continued)

(58) Field of Classification Search
CPC ...... B60W 20/20; B60W 10/08; B60W 10/26; B60L 1/003; B60L 3/0061; B60L 7/14;
(Continued)

(56) References Cited

U.S. PATENT DOCUMENTS 8,272,463 B2 * 9/2012 Kovach .................. B60K 6/12
180/65.27
8,695,743 B2 * 4/2014 Kraxner .................. B60K 6/48
180/165
(Continued)

FOREIGN PATENT DOCUMENTS

JP 3156340 B2 9/1993
JP 3505826 B2 6/1996
(Continued)

OTHER PUBLICATIONS

Kim et al., Control of a Brushless DC Motor/Generator in a Fuel Cell Hybrid Electric Vehicle, 2009, IEEE, p. 1973-1977.*
(Continued)

*Primary Examiner* — McDieunel Marc
(74) *Attorney, Agent, or Firm* — Mori & Ward, LLP

(57) ABSTRACT

An electric vehicle control apparatus includes a first motor generator, a booster, and a controller. The booster boosts an input voltage to the first motor generator. The controller controls the first motor generator to drive a load with regenerative power supplied during braking of an electric vehicle and to be driven at an inefficient operating point within an operable range of the first motor generator in a case where the regenerative power is used, the booster boosting an input voltage to the first motor generator so as to expand the operable range.

19 Claims, 13 Drawing Sheets

(51) Int. Cl.
| | |
|---|---|
| B60W 10/08 | (2006.01) |
| B60L 1/00 | (2006.01) |
| B60L 3/00 | (2006.01) |
| B60L 7/14 | (2006.01) |
| B60L 11/12 | (2006.01) |
| B60L 11/14 | (2006.01) |
| B60L 11/18 | (2006.01) |
| B60L 15/20 | (2006.01) |
| H02P 3/18 | (2006.01) |
| H02P 29/62 | (2016.01) |

(52) U.S. Cl.
CPC ............ *B60L 11/123* (2013.01); *B60L 11/14* (2013.01); *B60L 11/1861* (2013.01); *B60L 15/2009* (2013.01); *B60W 10/08* (2013.01); *B60W 10/26* (2013.01); *H02P 3/18* (2013.01); *H02P 29/62* (2016.02); *B60L 2240/12* (2013.01); *B60L 2240/421* (2013.01); *B60L 2240/423* (2013.01); *B60L 2240/427* (2013.01); *B60L 2240/429* (2013.01); *B60L 2240/441* (2013.01); *B60L 2240/443* (2013.01); *B60L 2240/547* (2013.01); *B60Y 2300/69* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y10S 903/93* (2013.01)

(58) Field of Classification Search
CPC .. B60L 11/1023; B60L 11/14; B60L 11/1861; B60L 15/2009; B60L 2240/12; B60L 2240/421; B60L 2240/423; B60L 2240/427; B60L 2240/429; B60L 2240/441; B60L 2240/443; B60L 2240/547; H02P 5/74; H02P 27/06
USPC .......................................................... 701/22
See application file for complete search history.

(56) References Cited

U.S. PATENT DOCUMENTS

| | | | | |
|---|---|---|---|---|
| 8,818,588 | B2* | 8/2014 | Ambrosio | B60K 6/48 180/65.21 |
| 8,827,016 | B2* | 9/2014 | Viengchai | B60K 6/12 180/65.21 |
| 9,718,372 | B2* | 8/2017 | Teraya | B60L 1/006 |
| 2005/0211490 | A1* | 9/2005 | Shimizu | B60K 1/00 180/243 |
| 2009/0243522 | A1 | 10/2009 | Suhama et al. | |
| 2012/0249024 | A1 | 10/2012 | Saha et al. | |
| 2014/0180517 | A1 | 6/2014 | Endo | |
| 2015/0120120 | A1 | 4/2015 | Ota | |
| 2016/0059843 | A1 | 3/2016 | Oguma et al. | |

FOREIGN PATENT DOCUMENTS

| | | |
|---|---|---|
| JP | 2006-280161 | 10/2006 |
| JP | 4561616 B2 | 6/2007 |
| JP | 2010-064679 | 3/2010 |
| JP | 5200797 B2 | 3/2010 |
| JP | 2010-143511 | 7/2010 |
| JP | 5200991 B2 | 9/2010 |
| JP | 5534323 B2 | 10/2011 |
| JP | 5510116 B2 | 1/2012 |
| JP | 2012-213253 | 11/2012 |
| JP | 5652659 B2 | 11/2012 |
| JP | 5762092 B2 | 11/2012 |
| JP | 5324015 B1 | 10/2013 |
| JP | 2014-103771 | 6/2014 |
| JP | 5712999 B2 | 7/2014 |
| JP | 5942958 B2 | 5/2015 |
| JP | 2015-113045 | 6/2015 |
| JP | 2016-049837 | 4/2016 |
| JP | 2017-077808 | 4/2017 |

OTHER PUBLICATIONS

Kawahashi, A New-Generation Hybrid Electric Vehicle and Its Supporting Power Semiconductor Devices, IEEE, p. 23-29.*
Ferreira et al., Regenerative Brake System for Small Scale Electric Bus, 2014, IEEE, p. 1-6.*
Haubert et al., Control Strategy of Energy Flow in Hybrid Propulsion System with Super-capacitor, 2013, IEEE, p. 1-5.*
Japanese Office Action for corresponding JP Application No. 2015-155283, dated Mar. 21, 2017 (w/ English machine translation).

* cited by examiner

APPARATUS AND METHOD OF CONTROLLING VEHICLE

CROSS REFERENCE TO RELATED APPLICATIONS

The present application claims priority under 35 U.S.C. § 119 to Japanese Patent Application No. 2015-155283, filed Aug. 5, 2015, entitled "Hybrid Vehicle Controller." The contents of this application are incorporated herein by reference in their entirety.

BACKGROUND

1. Field

The present disclosure relates to a hybrid vehicle control apparatus, an electric vehicle control apparatus, a method of controlling a hybrid vehicle, and a method of controlling an electric vehicle.

2. Description of the Related Art

Japanese Patent No. 3156340 describes an electric vehicle regenerative braking system in which a current to a drive motor is increased by a controller lowering a voltage applied to the drive motor when a battery is fully charged. An increase in current increases copper loss of the drive motor and loss by a resistor in an inverter, and generated electric power is consumed as Joule heat. Moreover, a radiator, a cooling pump, and a cooling fan are provided to release the generated heat. In this system, in an almost fully charged state where the regenerative power cannot be returned to the battery, the drive motor generates heat from the generated power and consumes the power, thereby compensating for insufficient regenerative braking force.

Japanese Unexamined Patent Application Publication No. 2006-280161 describes a regenerative controller for a hybrid electrical vehicle, including: a motor generator driven by an engine mounted on a vehicle; a battery charged with electric power generated by the motor generator; a drive motor configured to generate drive force by receiving electric power from the battery or the motor generator and perform regenerative braking of the vehicle; and an engine reverse drive unit (inverter controller) that drives the engine by supplying part of regenerative power outputted from the drive motor to the motor generator. The regenerative controller can continue the regenerative braking even when all the regenerative power cannot be charged into the battery.

Japanese Patent Nos. 3505826 and 5324015 and Japanese Unexamined Patent Application Publication Nos. 2014-103771 and 2010-143511 are examples of related art.

SUMMARY

According to one aspect of the present invention, a hybrid vehicle control apparatus includes an internal combustion engine, a first motor generator, an electricity storager, a second motor generator, a booster, and a controller. The first motor generator generates electric power using power of the internal combustion engine. The second motor generator is driven by electric power supplied from at least one of the electricity storager and the first motor generator. The booster boosts an input voltage of the second motor generator when the second motor generator operates as a motor. The controller performs control during braking of the hybrid vehicle to drive the first motor generator as a motor with regenerative power obtained by operating the second motor generator as a generator, and to drive the first motor generator at an inefficient operating point within an operable range of the first motor generator, which is expanded with the input voltage of the first motor generator boosted by the booster, when the first motor generator drives the internal combustion engine as load.

According to another aspect of the present invention, an electric vehicle control apparatus includes a first motor generator, a booster, and a controller. The booster boosts an input voltage to the first motor generator. The controller controls the first motor generator to drive a load with regenerative power supplied during braking of an electric vehicle and to be driven at an inefficient operating point within an operable range of the first motor generator in a case where the regenerative power is used, the booster boosting an input voltage to the first motor generator so as to expand the operable range.

According to further aspect of the present invention, a method of controlling an electric vehicle includes controlling a first motor generator to drive a load with regenerative power supplied during braking of an electric vehicle. An input voltage to the first motor generator is boosted so as to expand an operable range of the first motor generator. The first motor generator is controlled to be driven at an inefficient operating point within the operable range of the first motor generator in a case where the first motor generator drives the load.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
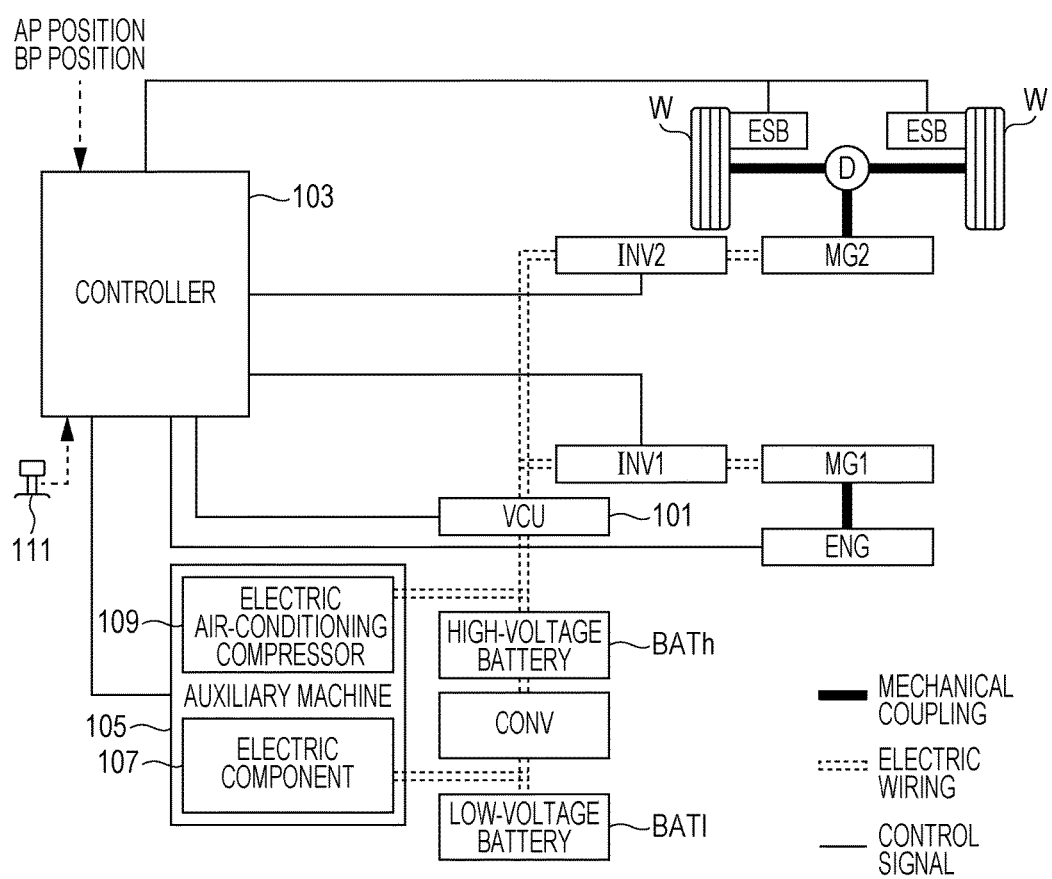
FIG. 1 is a block diagram showing an internal configuration of a series HEV (hybrid vehicle).

The embodiments will now be described with reference to the accompanying drawings, wherein like reference numerals designate corresponding or identical elements throughout the various drawings.

An embodiment of the present disclosure is described below with reference to the drawings.

An HEV (Hybrid Electrical Vehicle) includes a motor generator and an engine, and runs on drive force of the motor generator and/or engine according to a driving state of the vehicle. The HEV is broadly classified into two categories: series and parallel. A series HEV runs on power of a motor generator. An engine is mainly used to generate electric power. Electric power generated by another motor generator using power of the engine charges a battery or is supplied to the motor generator. On the other hand, a parallel HEV runs on drive force of either of or both of a motor generator and an engine.

(Configuration)

FIG. 1 is a block diagram showing an internal configuration of a series HEV. As shown in FIG. 1, the series HEV (hereinafter referred to as the "hybrid vehicle") includes an engine ENG, a first motor generator MG1, a second motor generator MG2, a high-voltage battery BATh, a converter CONV, a low-voltage battery BAT1, a VCU (Voltage Control Unit) 101, a first inverter INV1, a second inverter INV2, an electric servo brake ESB, and a controller 103. Note that, in FIG. 1, thick solid lines represent mechanical coupling, double dotted lines represent electric wiring, and narrow solid lines represent control signals.

The engine ENG drives the first motor generator MG1 as a generator. The engine ENG also functions as a load of the first motor generator MG1 that operates as a motor during braking of the hybrid vehicle. The first motor generator MG1 is driven by the power of the engine ENG to generate electric power. Moreover, the first motor generator MG1 may operate as a motor during braking of the hybrid vehicle. The second motor generator MG2 operates as a motor using power supplied from at least one of the high-voltage battery and the first motor generator MG1. Torque generated by the second motor generator MG2 is transmitted to a drive wheel W through a decelerator D. The second motor generator MG2 also operates as a generator during braking of the hybrid vehicle.

The high-voltage battery BATh includes a plurality of storage cells connected in series, and supplies a high voltage of 100 to 200 V, for example. The storage cells are lithium-ion cells or nickel-hydrogen cells, for example. The converter CONV lowers a DC output voltage of the high-voltage battery BATh as it is in a direct-current state. The low-voltage battery BAT1 stores the voltage lowered by the converter CONV, and supplies a constant voltage of 12 V, for example, to an electric component 107 included in an auxiliary machine 105.

The VCU 101 increases an input voltage of the second motor generator MG2 when the second motor generator MG2 operates as a motor. The VCU 101 also increases an output voltage of the second motor generator MG2 when the second motor generator MG2 operates as a generator during braking of the hybrid vehicle. Note that an output of the high-voltage battery BATh is used to increase the output voltage of the second motor generator MG2. The VCU 101 further steps down electric power generated by the second motor generator MG2 and converted into a direct current during braking of the hybrid vehicle or electric power generated by the first motor generator MG1 by the drive of the engine ENG and converted into a direct current. The electric power stepped down by the VCU 101 is supplied to an electric air-conditioning compressor 109 included in the auxiliary machine 105 or is charged into the high-voltage battery BATh.

Figure 2:
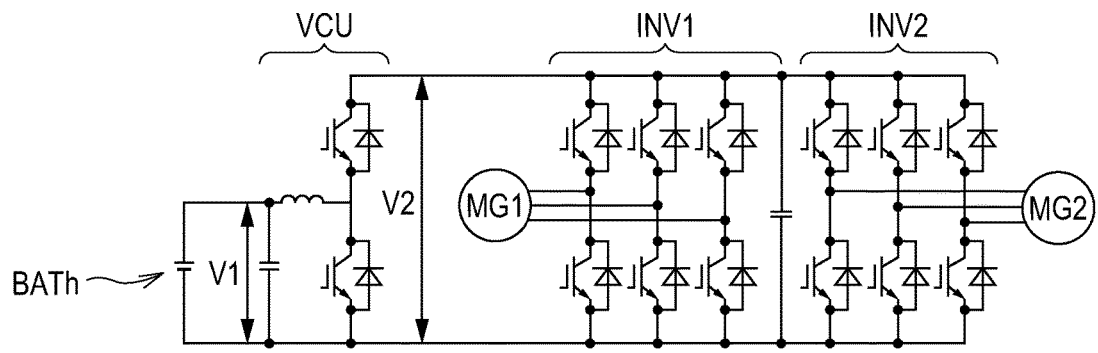
FIG. 2 is an electrical diagram showing relationships among a high-voltage battery, a VCU, a first inverter, a second inverter, a first motor generator, and a second motor generator.

FIG. 2 is an electrical diagram showing relationships among the high-voltage battery BATh, the VCU 101, the first inverter INV1, the second inverter INV2, the first motor generator MG1, and the second motor generator MG2. As shown in FIG. 2, the VCU 101 increases V2 voltage on the output side to a voltage higher than V1 voltage to be outputted by the high-voltage battery BATh, by switching on and off two switching elements with V1 voltage as an input voltage. Note that V2 voltage is equal to V1 voltage when the two switching elements in the VCU 101 are not switched on and off.

The first inverter INV1 converts an AC voltage generated by the first motor generator MG1 by the drive of the engine ENG into a DC voltage. Also, the first inverter INV1 converts the DC voltage, which is generated by the second motor generator MG2 and converted by the second inverter INV2 during braking of the hybrid vehicle, into an AC voltage, to supply a three-phase current to the first motor generator MG1. The second inverter INV2 converts a DC voltage into an AC voltage to supply a three-phase current to the second motor generator MG2. Also, the second inverter INV2 converts the AC voltage generated by the second motor generator MG2 during braking of the hybrid vehicle into a DC voltage.

The electric servo brake ESB brakes the hybrid vehicle with hydraulic pressure controlled according to an operation of a brake pedal by a driver of the hybrid vehicle.

The controller 103 controls the first inverter INV1, the second inverter INV2, the VCU 101, the engine ENG, the electric servo brake ESB, and the auxiliary machine 105. The controller 103 is described in detail later.

(Operation)

Figure 3:
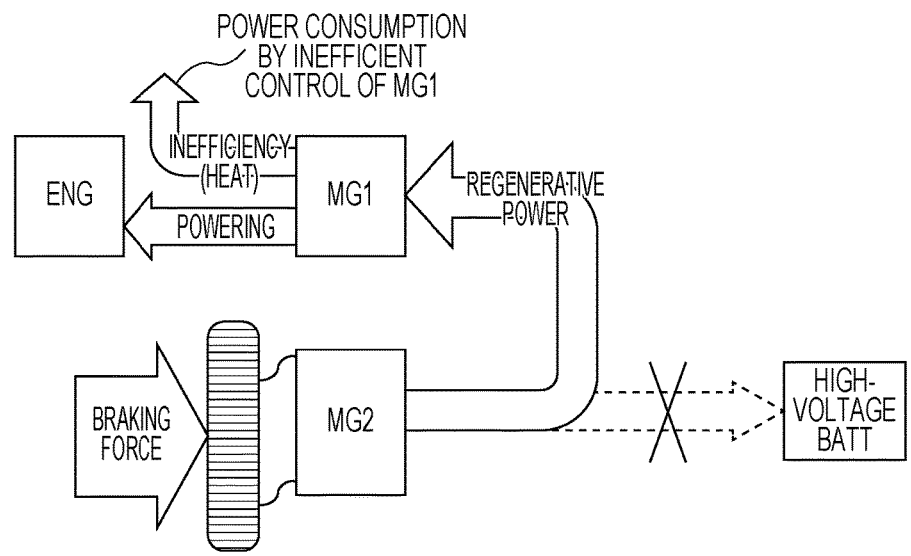
FIG. 3 is an explanatory diagram showing the flow of energy when the first motor generator is driven as a motor by regenerative power generated by the second motor generator, during braking of the hybrid vehicle.

In this embodiment, the second motor generator MG2 is used as a regenerative brake, which operates as a generator, during braking of the hybrid vehicle. However, when regenerative power generated by the second motor generator MG2 cannot be charged into the high-voltage battery BATh since the high-voltage battery BATh is fully charged, the regenerative power drives the first motor generator MG1 as a motor and the first motor generator MG1 drives the engine ENG as load. FIG. 3 is an explanatory diagram showing the flow of energy when the first motor generator MG1 is driven as a motor by the regenerative power generated by the second motor generator MG2, during braking of the hybrid vehicle.

In this embodiment, as shown in FIG. 3, when reversely driving the engine by powering operation of the first motor generator MG1, V2 voltage to be applied to the first motor generator MG1 is increased by the VCU 101, and field-strengthening control is performed such that d-axis current of the first motor generator MG1 is increased to a positive value, thereby driving the first motor generator MG1 at an inefficient operating point. Note that an operable range of the first motor generator MG1 is expanded by increasing V2 voltage to be applied to the first motor generator MG1. Moreover, in the first motor generator MG1 subjected to the field-strengthening control, output efficiency is reduced, and the amount of heat generated mostly by copper loss is increased. In the following description, the increase in V2 voltage to be applied to the first motor generator MG1 in powering operation and the field-strengthening control of the first motor generator MG1 are collectively referred to as "inefficient control".

Figure 4:
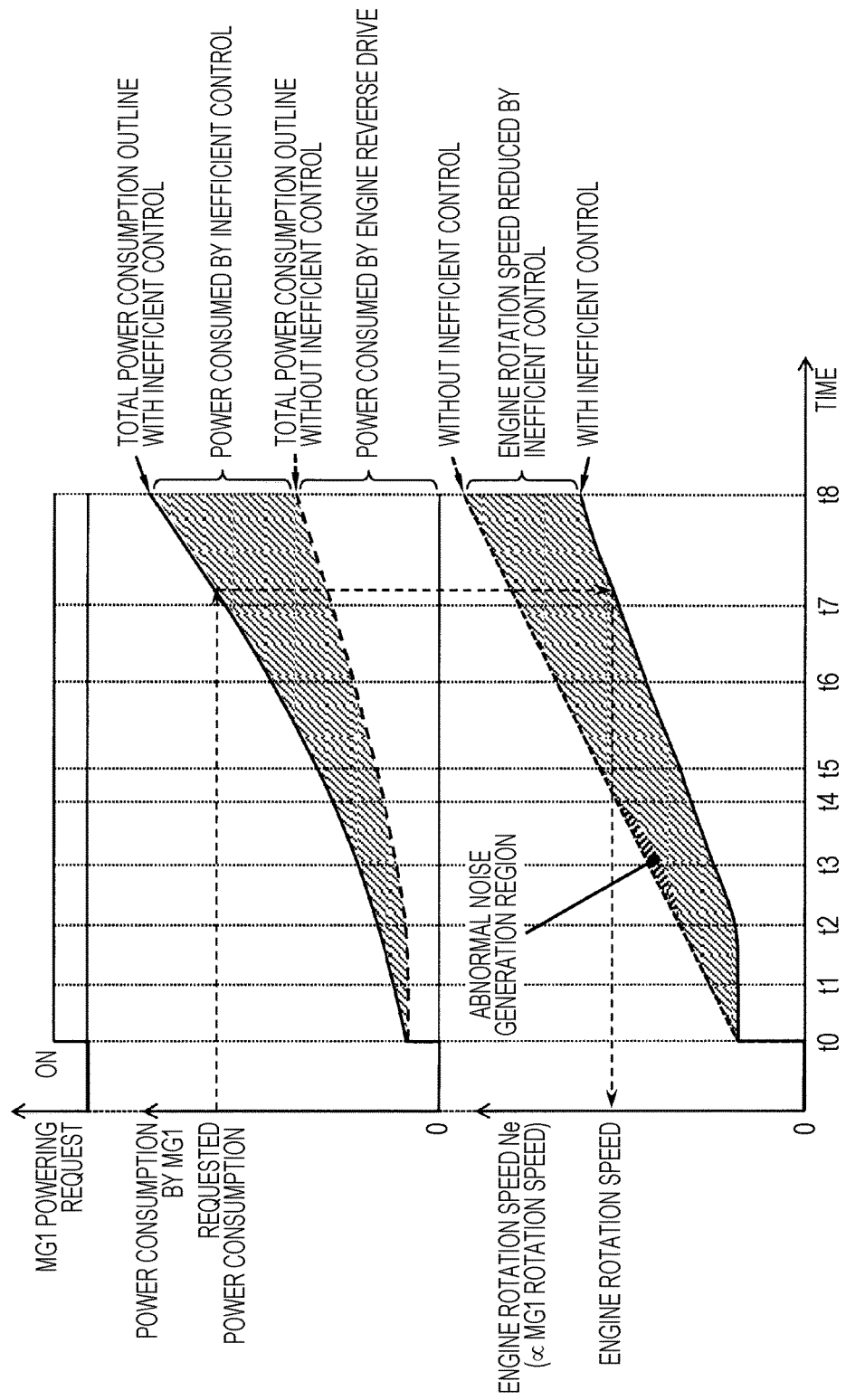
FIG. 4 is an explanatory diagram showing an example of displacement of power consumed by the first motor generator and rotation speed of the engine with and without inefficient control when reversely driving the engine by driving the first motor generator as a motor using the regenerative power generated by the second motor generator.
Figure 5:
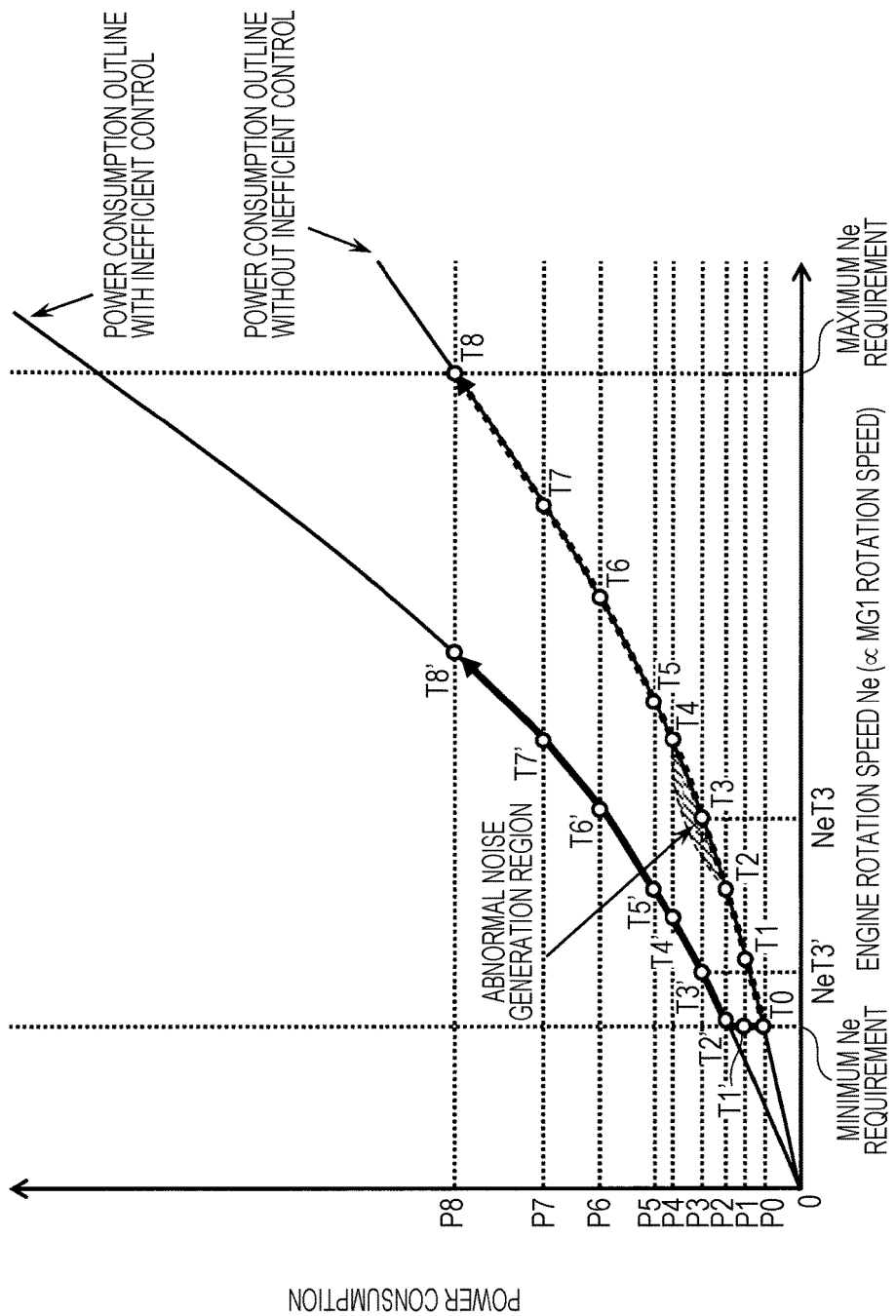
FIG. 5 is an explanatory diagram showing an example of a relationship between the power consumed by the first motor generator and the rotation speed of the engine with and without inefficient control when reversely driving the engine by driving the first motor generator as a motor using the regenerative power generated by the second motor generator.

FIG. 4 is an explanatory diagram showing an example of displacement of power consumed by the first motor generator MG1 and rotation speed of the engine ENG with and without inefficient control when reversely driving the engine ENG by driving the first motor generator MG1 as a motor using the regenerative power generated by the second motor generator MG2. FIG. 5 is an explanatory diagram showing an example of a relationship between the power consumed by the first motor generator MG1 and the rotation speed of the engine ENG with and without inefficient control when reversely driving the engine ENG by driving the first motor generator MG1 as a motor using the regenerative power generated by the second motor generator MG2. As shown in FIG. 4, with the inefficient control, a larger amount of power is consumed by the first motor generator MG1, and the rotation speed of the engine ENG (engine rotation speed) Ne is suppressed low. For example, as shown in FIG. 5, since power amount P3 is consumed by the first motor generator MG1, the engine rotation speed Ne needs to be increased to NeT3 without the inefficient control. However, with the inefficient control, the engine rotation speed Ne only needs to be increased to NeT3' lower than NeT3. Moreover, when the first motor generator MG1 reversely drives the engine ENG without the inefficient control, abnormal noise or vibration is generated by resonance of the engine ENG or the like in an operation region with a predetermined rotation speed and torque ($\infty$ power consumption/rotation speed). On the other hand, however, with the inefficient control, the first motor generator MG1 can reversely drive the engine ENG while avoiding such an abnormal noise generation region.

Next, description is given of an operating point of a motor generator represented by the first motor generator MG1 on a dq-axis coordinate system and V2 voltage applied to the motor generator with the inefficient control.

The range of the operating point of the motor generator is under constraints of the maximum current Imax suppliable to the motor generator and the voltage to be applied to the motor generator. The amplitude of the current (Id, Iq) of the motor generator is under constraint of the maximum current Imax and thus needs to satisfy Expression (1):

$$Id^2 + Iq^2 / \text{Imax}^2 \qquad (1)$$

Also, an induced voltage (Vdo, Vqo) of the motor generator is expressed by Expression (2):

$$\begin{bmatrix} Vd_0 \\ Vq_0 \end{bmatrix} = \begin{bmatrix} 0 & -\omega Lq \\ \omega Ld & 0 \end{bmatrix} \begin{bmatrix} Id \\ Iq \end{bmatrix} + \begin{bmatrix} 0 \\ \omega \psi_a \end{bmatrix}, \qquad (2)$$

where Ld and Lq are dq-axis inductances, $\omega$ is an angular speed of the motor generator, and $\psi a$ is an interlinkage magnetic flux.

From Expression (2), the dq induced voltage (the magnitude of vector sum of an induced voltage generated in a d-axis armature and an induced voltage generated in a q-axis armature) Vo can be expressed by Expression (3):

$$Vo = \sqrt{Vd_0^2 + Vq_0^2} = \omega \sqrt{(LdId + \psi a)^2 + (LqIq)^2} \qquad (3)$$

In this event, assuming that a clamping voltage of V2 voltage shown in FIG. 2 is Vom (Vom is determined by V2 voltage and a relational expression varies according to a modulation method of the control by the VCU 101), the dq induced voltage Vo needs to be not more than the clamping voltage Vom as shown in Expression (4):

$$Vo \leq Vom \qquad (4).$$

In other words, from Expressions (3) and (4), the range of the operating point of the motor generator is under the constraint of the voltage. Thus, Expression (5) needs to be satisfied:

$$(LdId + \psi a)^2 + (LqIq)^2 \leq \left(\frac{Vom}{\omega}\right)^2. \qquad (5)$$

Figure 6:
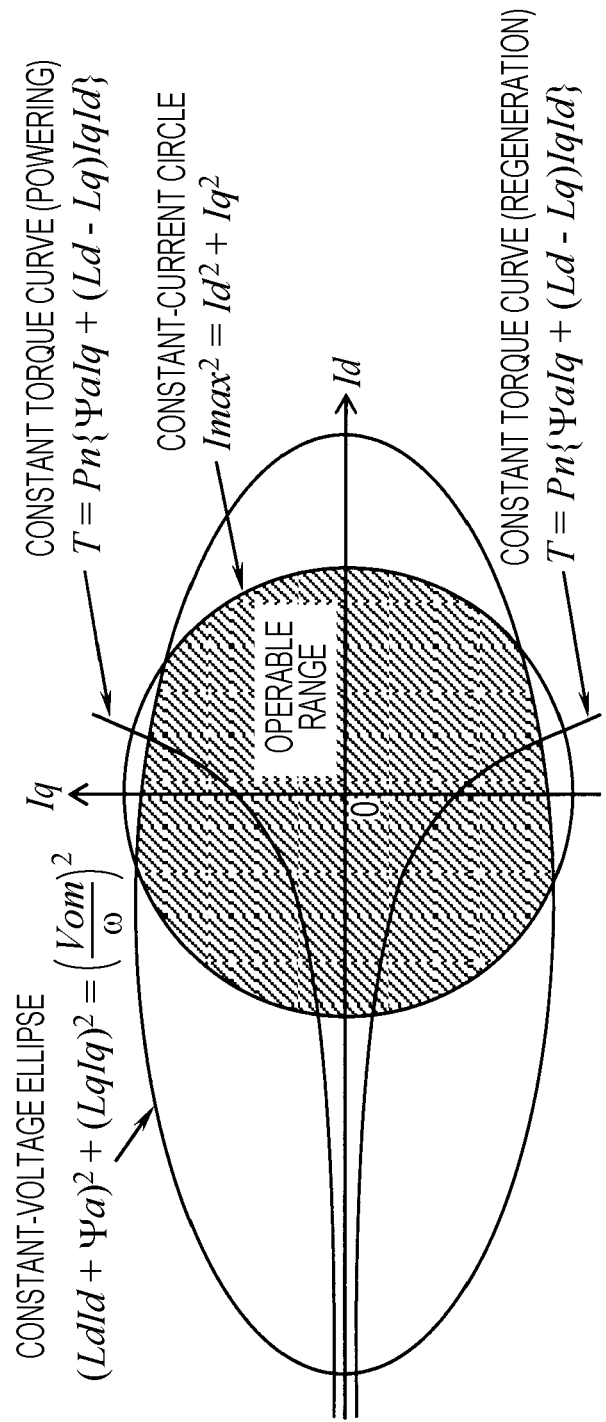
FIG. 6 is a diagram showing a constraint of a current and a constraint of a voltage at an operating point of a motor generator in a dq-axis current vector space.

As described above, the constraint imposed by the current on the operation of the motor generator is expressed by Expression (1), and Expression (1) is expressed by an internal region of a constant-current circle on a dq-axis current vector space shown in FIG. 6. Also, the constraint imposed by the voltage on the operation of the motor generator is expressed by Expression (5), and Expression (5) is expressed by an internal region of a constant-voltage ellipse on the dq-axis current vector space shown in FIG. 6. The range of the current that can be supplied to the motor generator is the range that satisfies Expressions (1) and (5), which is indicated by region hatched in FIG. 6.

Meanwhile, a torque T of the motor generator is expressed by Expression (6):

$$T = Pn\{\psi aIq + (Ld - Lq)IdIq\} \qquad (6),$$

where Pn is the number of pole pairs of the motor generator.

Expression (7) representing a constant torque curve is obtained by modifying Expression (6):

$$Iq = \frac{T}{Pn\{\psi a + (Ld - Lq)Id\}}. \tag{7}$$

Expression (7) represents a hyperbola with Id=ψa/(Lq−Ld), Iq=0 as an asymptote.

Incidentally, in the control of the operating point of the motor generator without the inefficient control, maximum torque control (control in which the tangent to the constant torque curve at the operating point is perpendicular to the current vector) to maximize the torque with respect to the current or maximum efficiency control (the operating point is often phase lead, i.e., moves the d-axis current in the negative direction compared with the maximum torque control) is performed, for example. More specifically, in the example shown in FIG. 7, the motor generator is driven at the operating points indicated by the circles on the dotted line.

Figure 7:
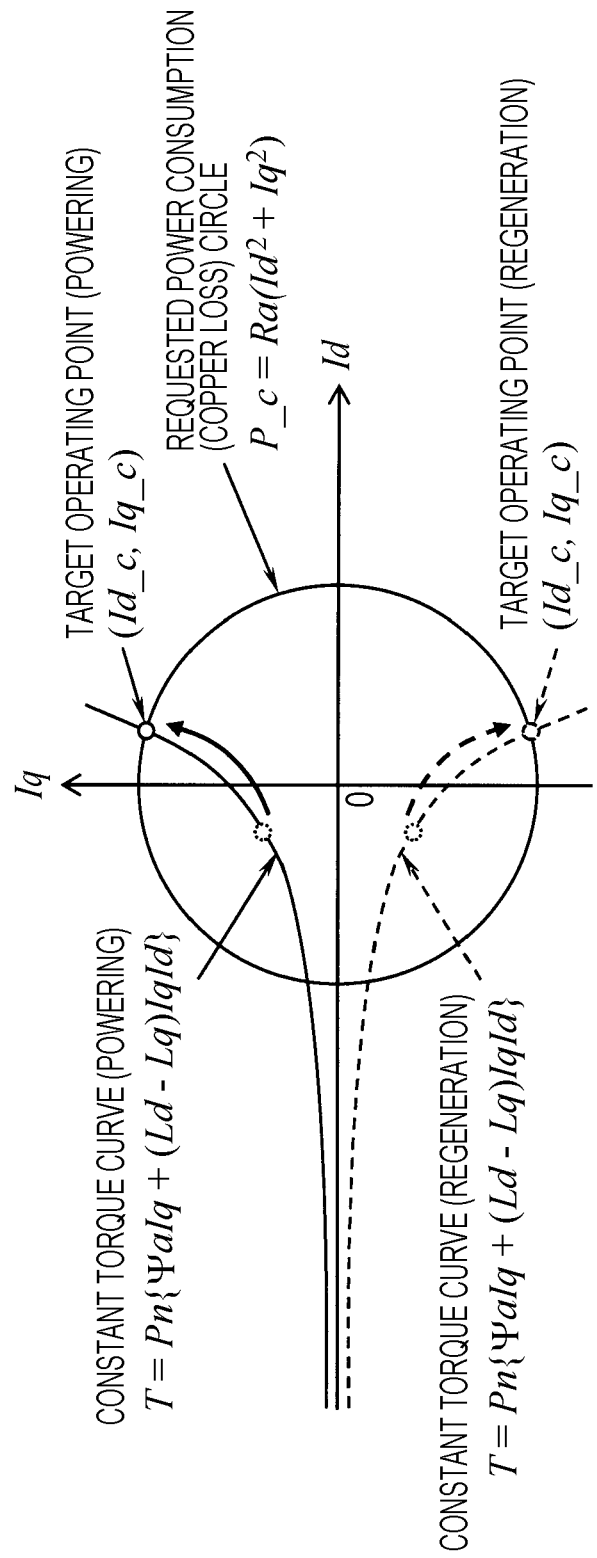
FIG. 7 is a diagram showing transition of the operating point of the motor generator before and after field-strengthening control.

On the other hand, in the inefficient control performed in this embodiment, the field-strengthening control is performed such that the d-axis current of the motor generator is increased to a positive value as shown in FIG. 7, and the operating points of the motor generator are moved such that the amplitude of the current (Id, Iq) of the motor generator is increased by increasing V2 voltage applied to the motor generator. The torque required to reversely drive the engine that is the load of the motor generator is determined by the friction corresponding to the engine rotation speed Ne, oil viscosity, which changes with the temperature and the like, or the like. However, from a qualitative perspective, when the torque is small, the constant torque curve approaches the asymptote, and thus the d-axis current is easily moved in the positive direction. Moreover, when the clamping voltage Vom of V2 voltage is large and the angular speed ω of the motor generator is small, the area of the constant-voltage ellipse is increased. Thus, the amplitude of the current (Id, Iq) of the motor generator is easily increased. For this reason, appropriate control of the clamping voltage Vom of V2 voltage and the angular speed ω of the motor generator enables the inefficient control of the motor generator to be efficiently performed.

Here, the angular speed ω of the motor generator has a value proportional to the rotation speed Ne of the engine ENG that is the load of the motor generator. In order to suppress the noise and vibration generated by the reverse drive of the engine ENG, it is desirable to avoid operation at a low rotation speed in the abnormal noise generation region. Meanwhile, in this embodiment, the reverse drive of the engine can be slowed down by the inefficient control. However, when the reverse drive of the engine is slowed down, the angular speed ω of the motor generator is also reduced. Therefore, in order to reduce the angular speed co of the motor generator, it is important to control the clamping voltage Vom, i.e., V2 voltage.

Here, assuming that a constant determined by the modulation method of switching control by the VCU 101 is k, Expression (8) is given:

$$Vom = kV2 \tag{8}$$

Furthermore, assuming that the target rotation speed of the engine ENG is Ne_c and the target angular speed of the motor generator, which is calculated from the target rotation speed Ne_c, is ω_c, the constant-voltage ellipse shown in FIG. 6 is expressed by Expression (9):

$$(LdId + \psi a)^2 + (LqIq)^2 = \left(\frac{kV2}{\omega\_c}\right)^2. \tag{9}$$

Assuming that the reverse drive torque of the engine ENG determined based on the target rotation speed Ne_c is T_c, the constant torque curve is expressed by Expression (10):

$$Iq = \frac{T\_c}{Pn\{\psi a + (Ld - Lq)Id\}}. \tag{10}$$

Moreover, power consumption P_c by copper loss in the motor generator with the inefficient control is expressed by Expression (11):

$$P\_c = Ra(Id^2 + Iq^2) \tag{11},$$

where Ra is a phase winding resistance of the motor generator.

The point of intersection between Expression (10) and Expression (11) is the solution of a biquadratic equation using these two expressions, and is algebraically obtained. However, if the motor generator is an inverse salient pole type, the solution (Id_c, Iq_c) that maximizes the q-axis current during powering and the solution (Id_c, Iq_c) that minimizes the q-axis current during regeneration are expressed as the dq current for the motor generator to satisfy the power consumption P_c with the inefficient control.

Figure 8:
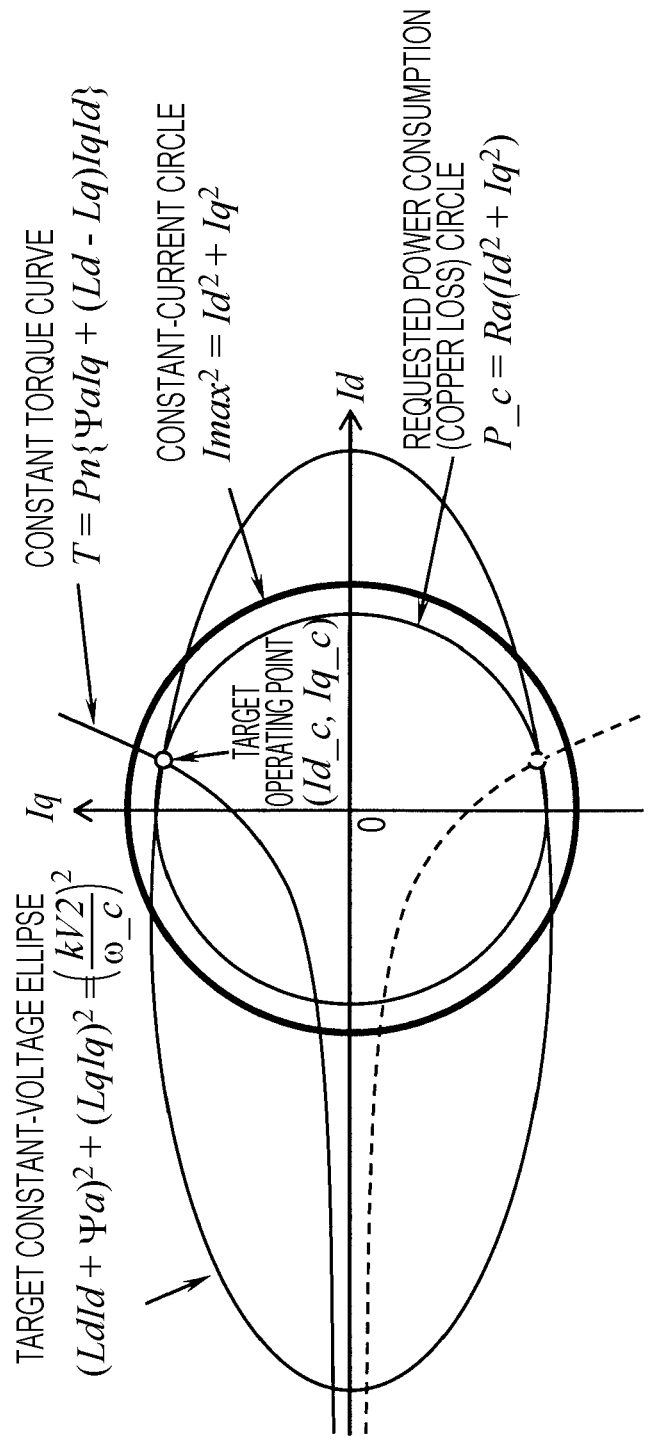
FIG. 8 is a diagram showing an example of a relationship between a target operating point of the motor generator and a constant-current circle of a maximum current Imax when the inefficient control is performed.

When the point of intersection (Id_c, Iq_c) described above satisfies Expression (1), i.e., "Id_c$^2$+Iq_c$^2$≤Imax$^2$" as shown in FIG. 8, the target operating point of the motor generator with the inefficient control is not under the constraint of the constant-current circle of the maximum current Imax but is under the constraint of the target constant-voltage ellipse. Therefore, V2 voltage is required to give a current vector with the point of intersection as the operating point. The V2 voltage in this event is the maximum voltage, i.e., target V2 voltage V2_c possible within the constraint of the constant-current circle of the maximum current Imax and the constraint of the target constant-voltage ellipse.

Figure 9:
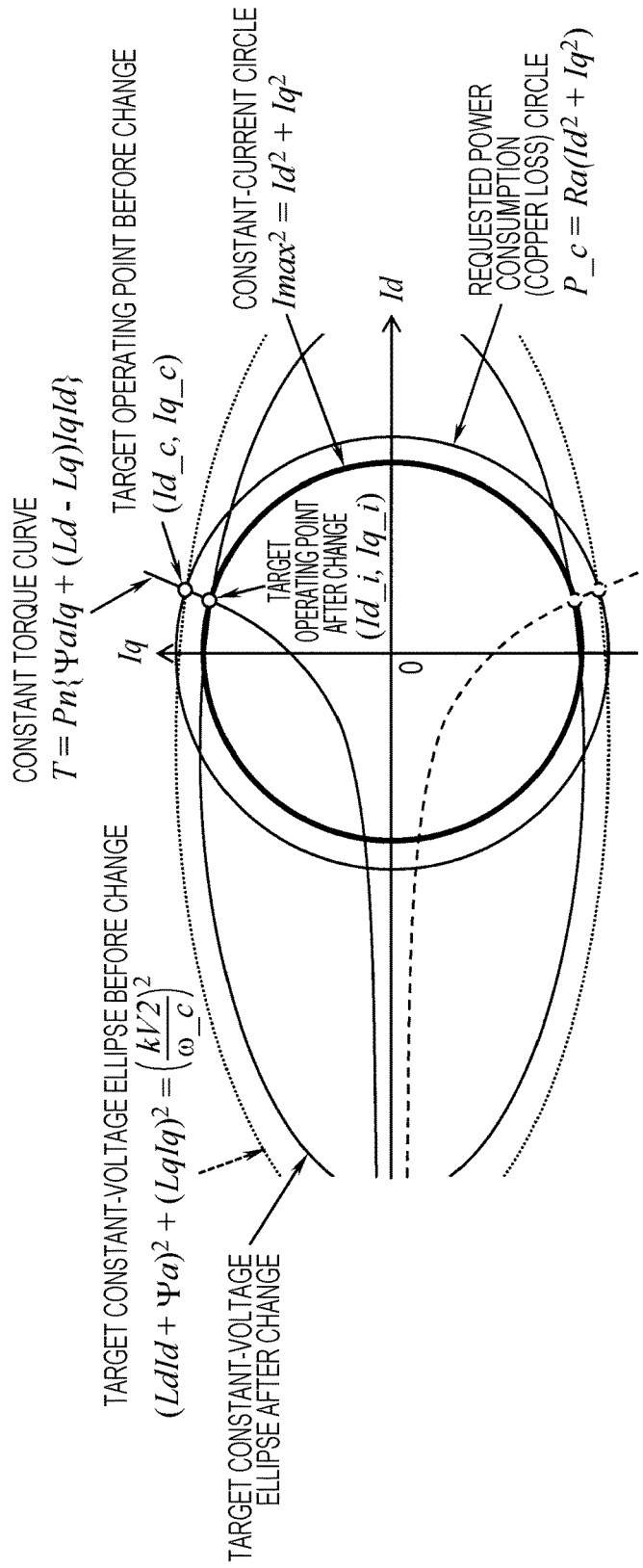
FIG. 9 is a diagram showing another example of the relationship between the target operating point of the motor generator and the constant-current circle of the maximum current Imax when the inefficient control is performed.

On the other hand, when the point of intersection (Id_c, Iq_c) described above does not satisfy Expression (1), i.e., "Id_c$^2$+Iq_c$^2$>Imax$^2$" as shown in FIG. 9, the target operating point of the motor generator with the inefficient control is under the constraint of the constant-current circle of the maximum current Imax. In this case, since the motor generator cannot be driven at the target operating point (Id_c, Iq_c), it is most preferable to drive the motor generator at the target operating point (Id_i, Iq_i) that satisfies Expression (1').

$$Id\_i^2 + Iq\_i^2 = Imax^2 \tag{1'}$$

Since Expression (1') represents the circumference of the constant-current circle, the target operation point (Id_i, Iq_i) after change is expressed as the point of intersection between Expression (10) and Expression (1'). The point of intersection between Expression (10) and Expression (1') is the solution of a biquadratic equation using these two expressions, and is algebraically obtained. However, if the motor generator is the inverse salient pole type, the solution (Id_i, Iq_i) that maximizes the q-axis current during powering and the solution (Id_i, Iq_i) that minimizes the q-axis current during regeneration are expressed as the dq current for the motor generator to consume as much power as possible with the inefficient control. The target operating point after change of the motor generator represented by the point of intersection under the constraint of the target constant-voltage ellipse after change. Therefore, V2 voltage is required to give a current vector with the point of intersection as the operating point. The V2 voltage in this event is the maximum voltage, i.e., target V2 voltage V2_c possible within the constraint of the constant-current circle of the maximum current Imax and the constraint of the target constant-voltage ellipse.

The target V2 voltage V2_c is expressed by Expression (9') obtained by modifying Expression (9):

$$V2\_c = \frac{\omega\_c}{k}\sqrt{(LdId + \psi a)^2 + (LqIq)^2} . \quad (9')$$

When the target operating point (Id_c, Iq_c) of the motor generator is not under the constraint of the current as shown in FIG. 8, (Id_c, Iq_c) is assigned to (Id, Iq) in Expression (9') and the target V2 voltage V2_c is calculated from Expression (12):

$$V2\_c = \frac{\omega\_c}{k}\sqrt{(LdId\_c + \psi a)^2 + (LqIq\_c)^2} . \quad (12)$$

On the other hand, when the target operating point (Id_c, Iq_c) of the motor generator is under the constraint of the current as shown in FIG. 9, (Id_i, Iq_i) is assigned to (Id, Iq) in Expression (9') and the target V2 voltage V2_c is calculated from Expression (13):

$$V2\_c = \frac{\omega\_c}{k}\sqrt{(LdId\_i + \psi a)^2 + (LqIq\_i)^2} . \quad (13)$$

Furthermore, the V2 voltage needs to be not more than the maximum voltage Vmax that can be applied to the motor generator. Thus, when the target V2 voltage V2_c calculated from Expression (12) or Expression (13) exceeds the maximum voltage Vmax, Expression (14) is set for the target V2 voltage V2 c:

$$V2\_c = V\max \quad (14).$$

Note that, with the target V2 voltage V2_c calculated from Expression (13) or Expression (14), a desired power consumption P_c cannot be covered by the inefficient control. Thus, the electric servo brake ESB consumes the power that cannot be consumed.

Figure 10:
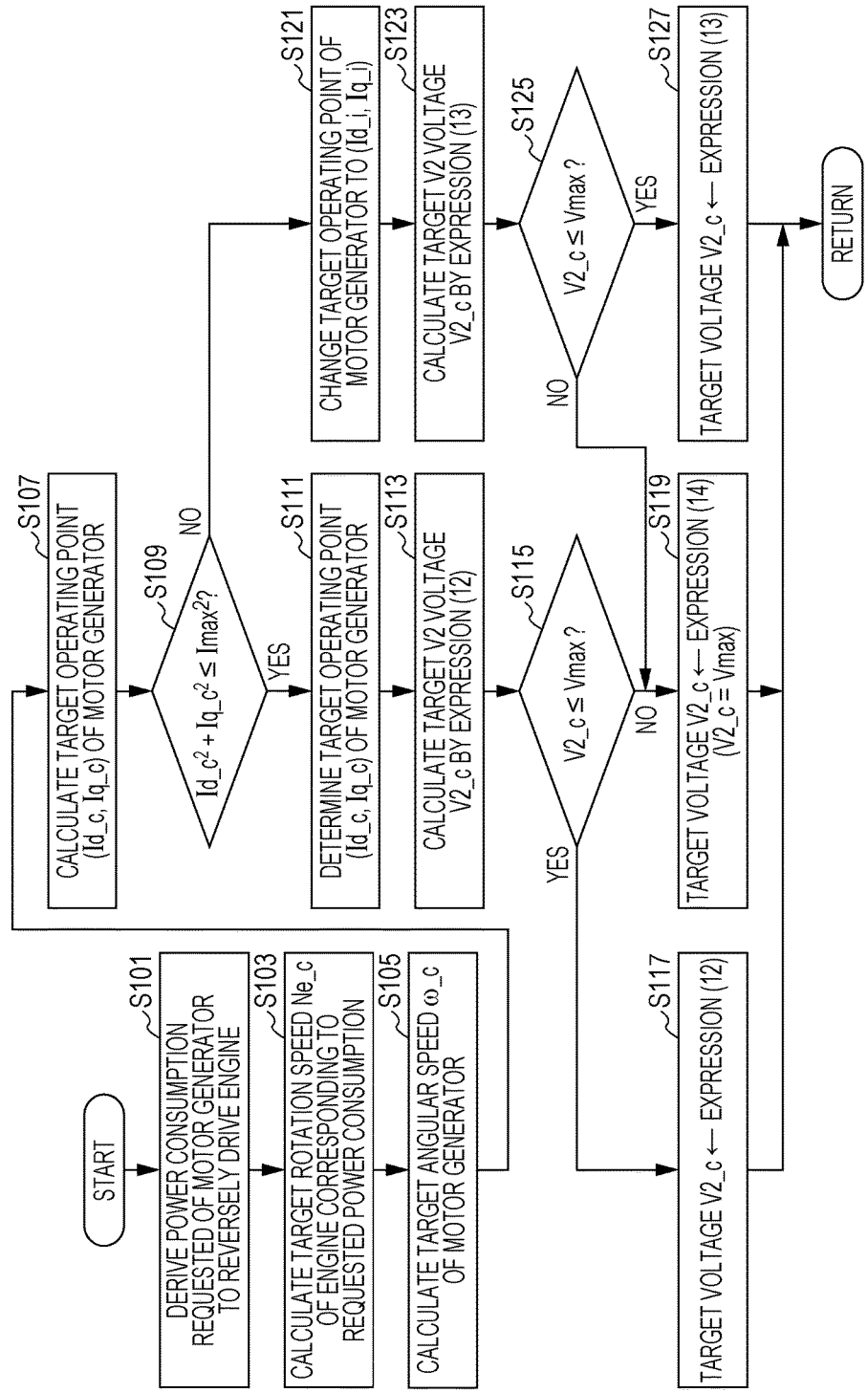
FIG. 10 is a flowchart showing a procedure followed by a controller to calculate the target operating point and target V2 voltage of the motor generator.

Next, description is given of a method for calculating the target operating point and the target V2 voltage of the motor generator by the controller 103. FIG. 10 is a flowchart showing a procedure followed by the controller 103 to calculate the target operating point and the target V2 voltage of the motor generator. As shown in FIG. 10, the controller 103 derives power consumption requested of the motor generator to reversely drive the engine ENG during braking of the hybrid vehicle, based on brake pedal force or the like (Step S101). Then, the controller 103 calculates the target rotation speed Ne_c of the engine ENG corresponding to the requested power consumption derived in Step S101 (Step S103). Thereafter, the controller 103 calculates the target angular speed ω_c of the motor generator from the target rotation speed Ne_c calculated in Step S103 (Step S105).

Subsequently, the controller 103 calculates the target operating point (Id_c, Iq_c) of the motor generator based on the constant torque curve (Expression (10)) corresponding to the reverse drive torque T_c of the engine ENG determined based on the target rotation speed Ne_c of the engine ENG calculated in Step S103 and the power consumption P_c (Expression (11)) by copper loss in the motor generator with the inefficient control (Step S107). Next, the controller 103 determines whether or not the amplitude of the current when the motor generator is driven at the target operating point (Id_c, Iq_c) is not more than the maximum current Imax (Id_c$^2$+Iq_c$^2$≤Imax$^2$) that can be supplied to the motor generator (Step S109). If Id_c$^2$+Iq_c$^2$≤Imax$^2$, the procedure advances to Step S111. If Id_c$^2$+Iq_c$^2$>Imax$^2$, the procedure advances to Step S121.

In Step S111, the controller 103 determines the target operating point (Id_c, Iq_c) calculated in Step S107 as the target operating point of the motor generator. Next, the controller 103 calculates the target V2 voltage V2_c from Expression (12) (Step S113). Then, the controller 103 determines whether or not the target V2 voltage V2 c calculated in Step S113 is not more than the maximum voltage Vmax (V2 c≤Vmax) that can be applied to the motor generator (Step S115). If V2_c≤Vmax, the procedure advances to Step S117. If V2_c>Vmax, the procedure advances to Step S119.

In Step S117, the controller 103 determines the value calculated from Expression (12) in Step S113 as the target V2 voltage V2_c. Then, in Step S119, the controller 103 cancels the value calculated from Expression (12) in Step S113, and determines the maximum voltage Vmax as the target V2 voltage V2_c.

Meanwhile, in Step S121, the controller 103 changes the target operating point of the motor generator to the target operating point (Id_i, Iq_i) that satisfies the condition "Id_i$^2$+Iq_i$^2$=Imax$^2$" on the same constant torque curve (Expression (10)). Next, the controller 103 calculates the target V2 voltage V2_c from Expression (13) (Step S123). Then, the controller 103 determines whether or not the target V2 voltage V2_c calculated in Step S123 is not more than the maximum voltage Vmax (V2_c≤Vmax) that can be applied to the motor generator (Step S125). If V2 c≤Vmax, the procedure advances to Step S127. If V2_c>Vmax, the procedure advances to Step S119. In Step S127, the controller 103 determines the value calculated from Expression (13) in Step S123 as the target V2 voltage V2_c.

As described above, in this embodiment, when reversely driving the engine ENG by powering operation of the first motor generator MG1 using the regenerative power generated by the second motor generator MG2 during braking of the hybrid vehicle, the V2 voltage to be applied to the first motor generator MG1 is increased to the target V2 voltage V2_c by the VCU 101 for field-strengthening control of the first motor generator MG1, thus performing inefficient control of the first motor generator MG1. Upon the inefficient control, the operable range of the first motor generator MG1 under the constraint of the V2 voltage can be expanded by increasing the V2 voltage to be applied to the first motor generator MG1 to the target V2 voltage V2_c. In this case, since the amplitude of the current (Id, Iq) of the motor generator can be increased, the power consumption by the first motor generator MG1 can be increased. If the power consumption by the first motor generator MG1 can be increased by the inefficient control as described above, the rotation speed of the engine ENG reversely driven by the first motor generator MG1 can be suppressed low compared to the case without the inefficient control, as shown in FIGS. 4 and 5. Thus, the noise and vibration caused by the rotation of the engine ENG can be reduced. Therefore, NV (Noise Vibration) performance of the hybrid vehicle can be improved while realizing the same braking force as that without the inefficient control. Moreover, load on the engine ENG can be reduced by suppressing the rotation speed of the engine ENG.

Moreover, in the first motor generator MG1 subjected to the inefficient control, field-strengthening control is performed such that the d-axis current at the operating point is increased to a positive value. Thus, the output efficiency is lowered, and the amount of heat generated mostly by copper loss is increased. As a result, the power consumption by the first motor generator MG1 is increased. Moreover, the field-strengthening control of the first motor generator MG1 makes it possible to suppress variation of a rotor in a thrust direction in the first motor generator MG1. Note that, in the first motor generator MG1 subjected to the field-strengthening control, since a magnetic flux generated by an unillustrated armature acts in a direction of strengthening the magnet field, demagnetization of the magnet is less likely to occur. Although resistance to demagnetization of the magnet is reduced at high temperature, the field-strengthening control provides a magnetic field in a magnetization direction without giving a demagnetizing field to the magnet even when the coil or magnet in the first motor generator MG1 is raised to high temperature. Thus, in the first motor generator MG1 subjected to the field-strengthening control, the resistance to demagnetization of the magnet is improved.

Furthermore, the larger the V2 voltage increased by the VCU 101, the more the power consumption by the first motor generator MG1 can be increased. Thus, a maximum possible V2 voltage is desirable as the target V2 voltage V2_c. The maximum possible target V2 voltage V2_c is a V2 voltage for driving the first motor generator MG1 at the target operating point where the target constant-voltage ellipse and the constant torque curve intersect in the case shown in FIG. 8, and is a V2 voltage for driving the first motor generator MG1 at the target operating point after change under the constraint of the constant-current circle of the maximum current Imax in the case shown in FIG. 9.

However, when the engine ENG is reversely driven at a low rotation speed by the first motor generator MG1, a low-frequency muffled sound (several ten Hz to one hundred and several ten Hz) is generated by mechanical torsional resonance, engine mounting resonance or the like attributable to engine torque variation. Thus, even during reverse drive, the rotation speed of the engine ENG needs to be maintained at a rotation speed higher than the minimum Ne requirement shown in FIG. 5. Therefore, when the power consumption requested of the first motor generator MG1 is small, the rotation speed of the engine ENG is maintained at a rotation speed higher than the minimum Ne requirement. Thus, the target V2 voltage V2_c does not always have to be the maximum value. The NV performance can be further improved by determining an appropriate value as the target V2 voltage V2_c.

Example 1: Execution of Inefficient Control Upon Driving Down Slope

The hybrid vehicle shown in FIG. 1 is provided with "P range" corresponding to a parking range, "N range" corresponding to a neutral range, "R range" corresponding to a reverse drive range, "D range" corresponding to a first forward drive range, and "B range" corresponding to a second forward drive range, as shift ranges selected based on the position of a shift lever 111. The D range and B range are both forward drive ranges as the shift ranges. The D range is used during normal driving (during driving other than the B range). The B range is the shift range to increase the regeneration amount compared with the D range when the driver wishes to increase the regeneration amount in the hybrid vehicle. Therefore, when the hybrid vehicle drives down a slope, the controller 103 performs control for obtaining the regeneration amount larger than that in the D range.

Figure 11:
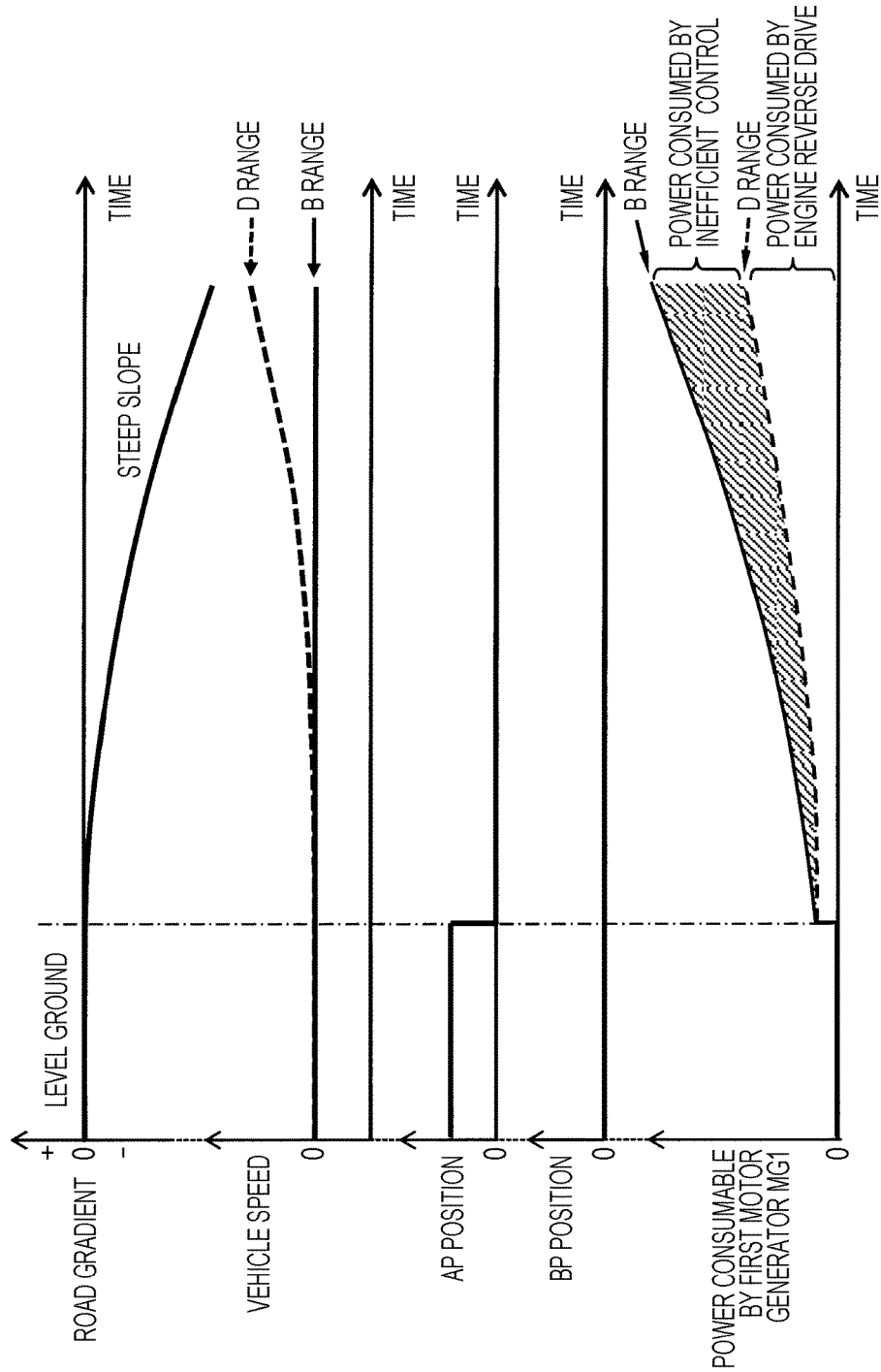
FIG. 11 is an explanatory diagram showing displacement when the hybrid vehicle drives down a slope in the cases where B range is selected and where D range is selected.
Figure 12:
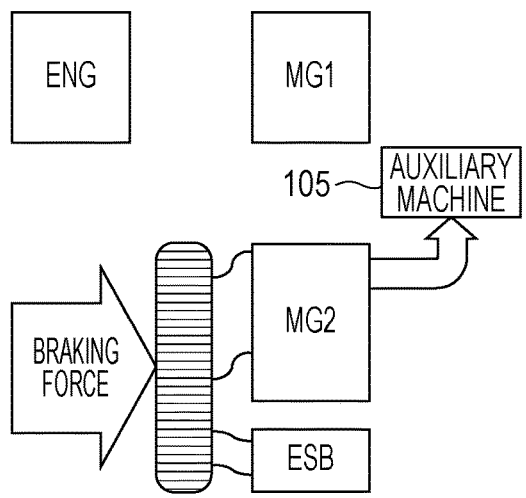
FIG. 12 is an explanatory diagram showing a consumption mode in Case 1 for the regenerative power generated by the second motor generator during braking of the hybrid vehicle.

FIG. 11 is an explanatory diagram showing displacement when the hybrid vehicle drives down a slope in the cases where the B range is selected and where the D range is selected. As shown in FIG. 11, when the hybrid vehicle comes to a downslope during running on a level ground and an accelerator pedal is returned (AP position←0), the second motor generator MG2 in powering operation is regeneratively driven to cause braking force to act on the hybrid vehicle. In this event, if the high-voltage battery BATh is fully charged, the regenerative power generated by the second motor generator MG2 is supplied to the first motor generator MG1, and the controller 103 controls the first motor generator MG1 to perform powering operation by driving the engine ENG as load.

If the D range is selected in this event, the controller 103 controls the first inverter INV1 such that the first motor generator MG1 performs powering operation by driving the engine ENG as load, without performing the inefficient control described above, according to the requested power consumption corresponding to the road gradient. However, when the gradient of the downslope is increased, sufficient braking force cannot be obtained with the power consumed by the first motor generator MG1 in the reverse drive of the engine ENG, resulting in an increase in vehicle speed. On the other hand, when the B range is selected, the controller 103 controls the first inverter INV1 and the VCU 101 such that the first motor generator MG1 performs powering operation by driving the engine ENG as load, by performing the inefficient control described above, according to the requested power consumption corresponding to the road gradient. In this event, since the power that can be consumed by the first motor generator MG1 is large, a constant vehicle speed can be maintained even when the gradient of the downslope is increased.

As described above, according to this example, even if the high-voltage battery BATh is fully charged when the hybrid vehicle drives down a slope, the inefficient control is performed if the B range is selected. Thus, the braking force corresponding to the road gradient is obtained without the driver operating the brake pedal (BP position=0).

Example 2: Target for Inefficient Control and Execution Conditions

The hybrid vehicle shown in FIG. 1 is equipped with the first motor generator MG1 and the second motor generator MG2. During braking of the hybrid vehicle, a regenerative brake is used, which operates the second motor generator MG2 as a generator. Therefore, the inefficient control described above can be performed not only for the first motor generator MG1 but also for the second motor generator MG2. When the inefficient control is performed for the second motor generator MG2, the amount of heat in the second motor generator MG2, which is generated mostly by copper loss, is increased, and power consumption occurs in the second motor generator MG2.

With reference to FIGS. 12 to 17, description is given below of a consumption mode for the regenerative power generated by the second motor generator MG2 during braking of the hybrid vehicle, the consumption mode being classified into six cases according to the magnitude of the regenerative power. Note that consumption control of the regenerative power in each case is performed by the controller 103. In the following description, "auxiliary machine power consumption" means power consumed by the auxiliary machine 105 shown in FIG. 1. Moreover, "battery receivable power" means power that can be charged into the high-voltage battery BATh shown in FIG. 1.
<Case 1>
Regenerative Power≤Auxiliary Machine Power Consumption In Case 1, since the above relationship is established, the auxiliary machine 105 consumes the regenerative power indicated by the arrow in FIG. 12.
<Case 2>
Auxiliary Machine Power≤Consumption Regenerative Power≤[Auxiliary Machine Power Consumption+Battery Receivable Power]

Figure 13:
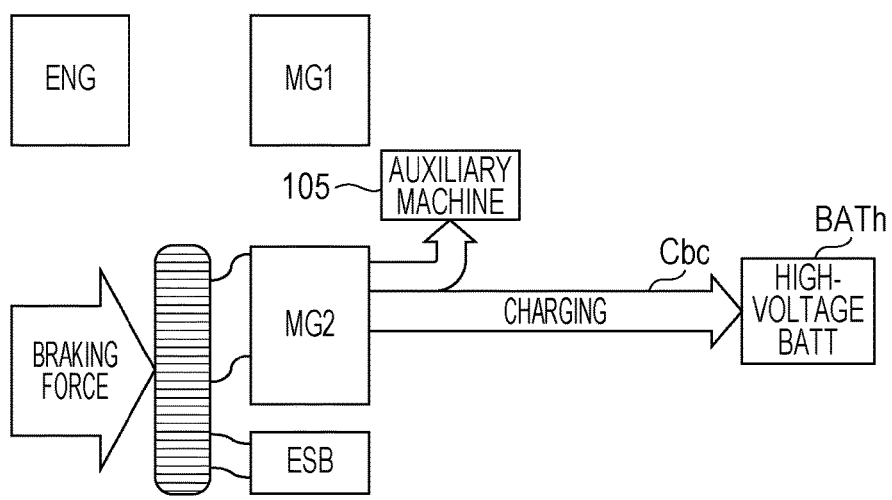
FIG. 13 is an explanatory diagram showing a consumption mode in Case 2 for the regenerative power generated by the second motor generator during braking of the hybrid vehicle.

In Case 2, since the above relationship is established, power (battery charging power Cbc) that cannot be consumed by the auxiliary machine 105, among the regenerative power indicated by the arrow in FIG. 13, is charged into the high-voltage battery BATh.
<Case 3>
[Auxiliary Machine Power Consumption+Battery Receivable Power]≤Regenerative Power≤[Auxiliary Machine Power Consumption+Battery Receivable Power+MG2 Inefficient Control Power Consumption]

Figure 14:
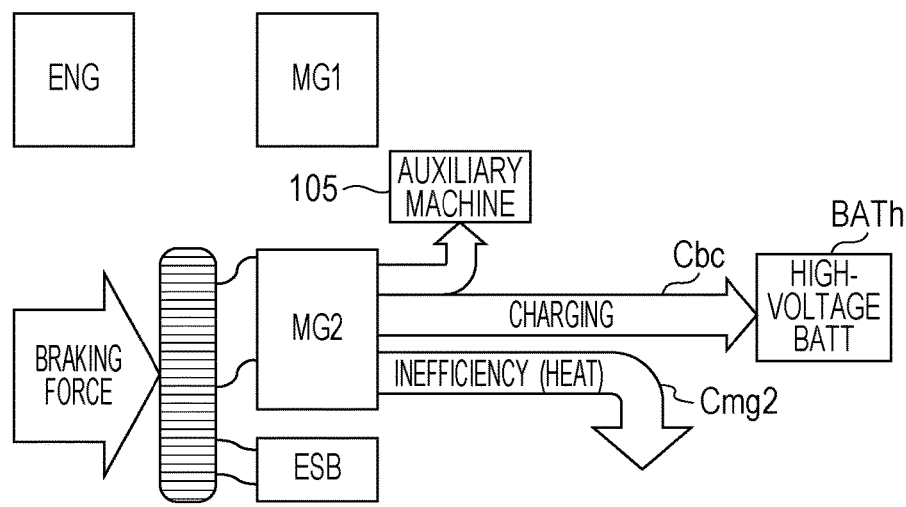
FIG. 14 is an explanatory diagram showing a consumption mode in Case 3 for the regenerative power generated by the second motor generator during braking of the hybrid vehicle.

In Case 3, since the above relationship is established, power (MG2 inefficient control power consumption Cmg2) that cannot be consumed by [auxiliary machine consumption+battery charging], among the regenerative power indicated by the arrow in FIG. 14, is consumed by the inefficient control of the second motor generator MG2.
<Case 4>
[Auxiliary Machine Power Consumption+Battery Receivable Power+MG2 Inefficient Control Power Consumption]≤Regenerative Power≤[Auxiliary Machine Power Consumption+Battery Receivable Power+MG2 Inefficient Control Power Consumption+Engine Reverse Drive Power Consumption]

Figure 15:
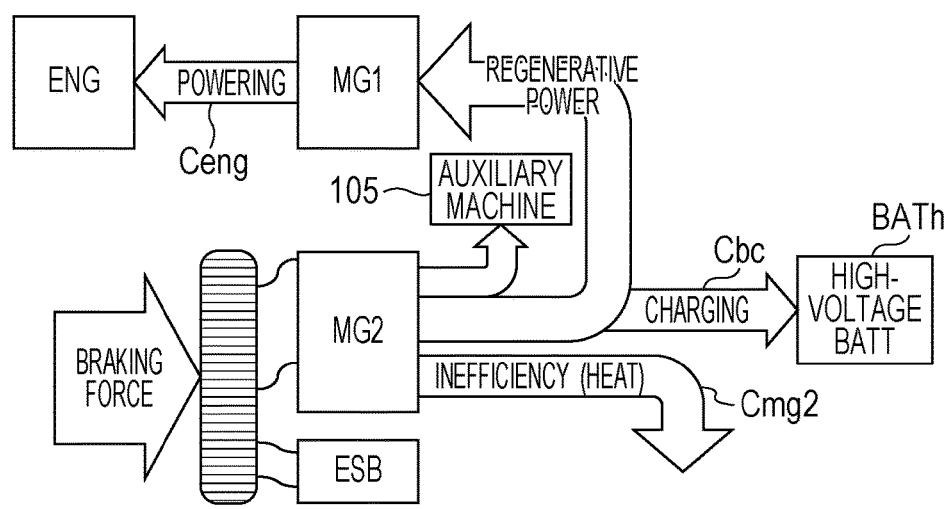
FIG. 15 is an explanatory diagram showing a consumption mode in Case 4 for the regenerative power generated by the second motor generator during braking of the hybrid vehicle.

In Case 4, since the above relationship is established, power (engine reverse drive power consumption Ceng) that cannot be consumed by [auxiliary machine consumption+battery charging+MG2 inefficient control consumption], among the regenerative power indicated by the arrow in FIG. 15, is consumed by powering operation of the first motor generator MG1 without the inefficient control by driving the engine ENG as load.

Note that some of the regenerative power in Case 4 may be consumed in Case 5 to be described later from the perspective of the NV performance according to the rotation speed of the engine ENG.
<Case 5>
[Auxiliary Machine Power Consumption+Battery Receivable Power+MG2 Inefficient Control Power Consumption+Engine Reverse Drive Power Consumption]≤Regenerative Power≤[Auxiliary Machine Power Consumption+Battery Receivable Power+MG2 Inefficient Control Power Consumption+Engine Reverse Drive Power Consumption+MG1 Inefficient Control Power Consumption]

Figure 16:
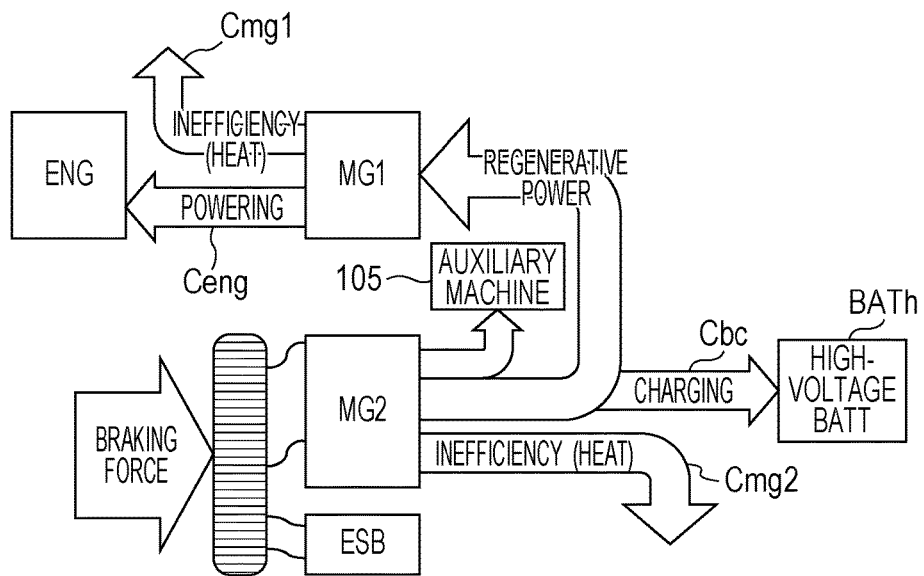
FIG. 16 is an explanatory diagram showing a consumption mode in Case 5 for the regenerative power generated by the second motor generator during braking of the hybrid vehicle.
Figure 17:
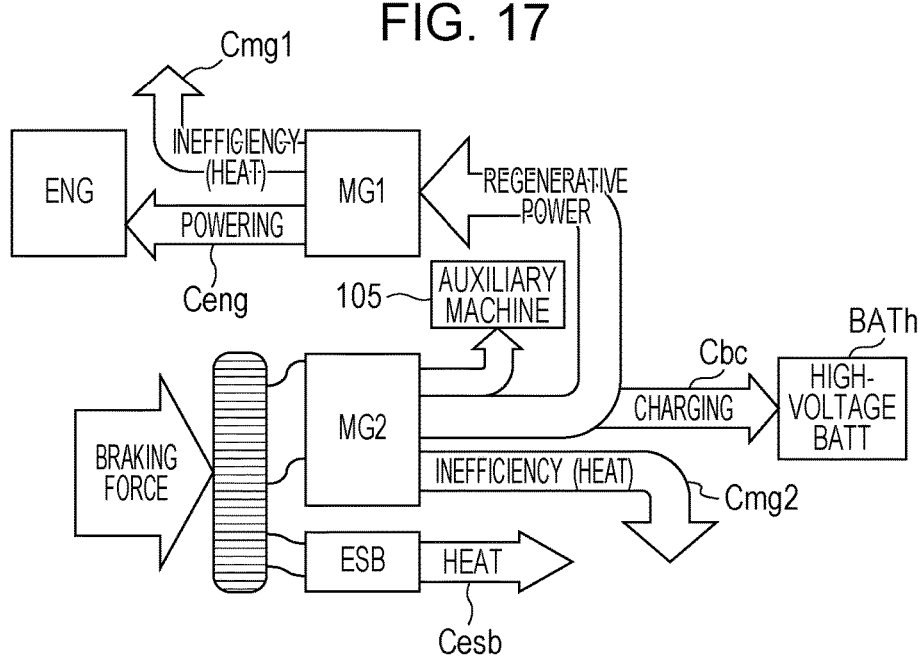
FIG. 17 is an explanatory diagram showing a consumption mode in Case 6 for the regenerative power generated by the second motor generator during braking of the hybrid vehicle.

In Case 5, since the above relationship is established, power (MG1 inefficient control power consumption Cmg1) that cannot be consumed by [auxiliary machine consumption+battery charging+MG2 inefficient control consumption+engine reverse drive power consumption], among the regenerative power indicated by the arrow in FIG. 16, is consumed by the inefficient control of the first motor generator MG1.
(When Case 4 is not performed, power (engine reverse drive power consumption Ceng+MG1 inefficient control power consumption Cmg1) that cannot be consumed by [auxiliary machine consumption+battery charging+MG2 inefficient control consumption] is consumed by the powering operation of the first motor generator MG1 driving the engine ENG as load and the inefficient control of the first motor generator MG1.)
<Case 6>
[Auxiliary Machine Power Consumption+Battery Receivable Power+MG2 Inefficient Control Power Consumption+Engine Reverse Drive Power Consumption+MG1 Inefficient Control Power Consumption]≤Regenerative Power In Case 6, since the above relationship is established, power (heat power consumption Cesb) that cannot be consumed by [auxiliary machine consumption+battery charging+MG2 inefficient control consumption+engine reverse drive consumption+MG1 inefficient control consumption] is consumed by the electric servo brake ESB as shown in FIG. 17.

As described above, according to this example, the regenerative power can be efficiently consumed by the controller 103 controlling as in each case according to the magnitude of the regenerative power generated by the second motor generator MG2 during braking of the hybrid vehicle. Moreover, the power consumption by the electric servo brake ESB occurs only when the regenerative power cannot be covered by the power consumption by other components including the inefficient control. Therefore, power consumption requested of the electric servo brake ESB is small. Thus, the capacity of the electric servo brake ESB can be suppressed. In other words, the electric servo brake ESB mounted on the hybrid vehicle may be small.

Note that the embodiment of the present disclosure is not limited to the embodiment described above but appropriate modifications, changes, and the like can be made. For example, the hybrid vehicle described above is a series HEV but may be a parallel HEV or an HEV capable of switching between the series and parallel.

In order to realize the controller in the present application, a first aspect of the embodiment is a hybrid vehicle controller (for example, a controller 103 in an embodiment) including: an internal combustion engine (for example, an engine ENG in the embodiment); a first motor generator (for example, a first motor generator MG1 in the embodiment) that generates electric power using power of the internal combustion engine; an electricity storager (for example, a high-voltage battery BATh in the embodiment); a second motor generator (for example, a second motor generator MG2 in the embodiment) that is driven by electric power supplied from at least one of the electricity storager and the first motor generator; and a booster (for example, a VCU 101 in the embodiment) that boosts an input voltage of the second motor generator when the second motor generator operates as a motor. During braking of the hybrid vehicle, the controller performs control to drive the first motor generator as a motor with regenerative power obtained by operating the second motor generator as a generator, and to drive the first motor generator at an inefficient operating point within an operable range of the first motor generator, which is expanded with the input voltage of the first motor generator boosted by the booster, when the first motor generator drives the internal combustion engine as load.

In a second aspect of the embodiment according to the first aspect of the embodiment, when the first motor generator is driven as the motor, the controller may perform field-strengthening control of the first motor generator.

In a third aspect of the embodiment according to one of the first and second aspects of the embodiment, the input voltage of the first motor generator boosted by the booster may be a maximum possible voltage within a constraint of a maximum current suppliable to the first motor generator and within a constraint of a voltage to be applied to the first motor generator.

In a fourth aspect of the embodiment according to the third aspect of the embodiment, the input voltage of the first motor generator boosted by the booster may be determined based on a target rotation speed of the internal combustion engine reversely driven by the first motor generator and power consumption by the first motor generator.

In a fifth aspect of the embodiment according to any one of the first to fourth aspects of the embodiment, whether to operate the first motor generator at the inefficient operating point may be determined based on the magnitude of the regenerative power.

According to the first aspect of the embodiment, the operable range of the first motor generator can be expanded by boosting the input voltage of the first motor generator. The amplitude of the current of the first motor generator can be increased by driving the first motor generator at the inefficient operating point within the expanded operable range. Thus, the power consumption by the first motor generator can be increased. By increasing the power consumption by the first motor generator, the rotation speed of the internal combustion engine reversely driven by the first motor generator can be suppressed low. Accordingly, noise and vibration caused by the rotation of the internal combustion engine can be reduced. Thus, NV (Noise Vibration) performance of the hybrid vehicle can be improved without lowering the braking force. Moreover, load on the internal combustion engine can be reduced by suppressing the rotation speed of the internal combustion engine.

According to the second aspect of the embodiment, a d-axis current is increased to a positive value by performing the field-strengthening control of the first motor generator. Thus, output efficiency of the first motor generator is lowered, and the amount of heat generated mostly by copper loss is increased. As a result, power consumption by the first motor generator is increased. Moreover, the field-strengthening control of the first motor generator makes it possible to suppress variation of a rotor in a thrust direction in the first motor generator.

According to the third aspect of the embodiment, the larger the input voltage of the first motor generator boosted by the booster, the more the power consumption by the first motor generator can be increased. Thus, the maximum possible voltage within the constraint of the maximum current suppliable to the first motor generator and within the constraint of the voltage to be applied to the first motor generator is desirable as the input voltage.

According to the fourth aspect of the embodiment, it is desirable that the input voltage of the first motor generator boosted by the booster is determined based on the target rotation speed of the internal combustion engine reversely driven by the first motor generator and the power consumption by the first motor generator.

According to the fifth aspect of the embodiment, the regenerative power can be efficiently consumed by determining whether to operate the first motor generator at the inefficient operating point based on the magnitude of the regenerative power generated by the second motor generator.

Obviously, numerous modifications and variations of the present invention are possible in light of the above teachings. It is therefore to be understood that within the scope of the appended claims, the invention may be practiced otherwise than as specifically described herein.

What is claimed is:
1. A hybrid vehicle control apparatus comprising:
an internal combustion engine;
a first motor generator that generates electric power using power of the internal combustion engine;
an electricity storage device;
a second motor generator that is driven by electric power supplied from at least one of the electricity storage device and the first motor generator;
a boost circuit that boosts an input voltage of the second motor generator when the second motor generator operates as a motor; and
a controller configured to perform control during braking of the hybrid vehicle when the first motor generator drives the internal combustion engine as a load, the control including:
driving the first motor generator as a motor with regenerative power obtained by operating the second motor generator as a generator, and
driving the first motor generator at an inefficient operating point within an operable range of the first motor generator, the operable range being expanded with the input voltage of the first motor generator boosted by the boost circuit.
2. The hybrid vehicle control apparatus according to claim 1, wherein
when the first motor generator is driven as the motor, the controller performs field-strengthening control of the first motor generator.
3. The hybrid vehicle control apparatus according to claim 1, wherein
the input voltage of the first motor generator boosted by the boost circuit is a maximum possible voltage within a constraint of a maximum current suppliable to the first motor generator and within a constraint of a voltage to be applied to the first motor generator.
4. The hybrid vehicle control apparatus according to claim 3, wherein
the input voltage of the first motor generator boosted by the boost circuit is determined based on a target rotation speed of the internal combustion engine reversely driven by the first motor generator and power consumption by the first motor generator.
5. The hybrid vehicle control apparatus according to claim 1, wherein
whether to operate the first motor generator at the inefficient operating point is determined based on the magnitude of the regenerative power.
6. The hybrid vehicle control apparatus according to claim 1, wherein
the controller is configured to drive the first motor generator with regenerative power obtained by operating the second motor generator without charging the electricity storage device.
7. The hybrid vehicle control apparatus according to claim 6, wherein the controller is determined to drive the first motor generator with regenerative power in response to a determination that the electricity storage device cannot be charged.

8. An electric vehicle control apparatus comprising:
a first motor generator;
a boost circuit to boost an input voltage to the first motor generator; and
a controller configured to:
control the first motor generator to drive a load with regenerative power supplied during braking of an electric vehicle,
control the first motor generator to be driven at an inefficient operating point within an operable range of the first motor generator in a case where the regenerative power is used, and
control the boost circuit to boost an input voltage to the first motor generator so as to expand the operable range during braking of the electric vehicle.

9. The electric vehicle control apparatus according to claim 8, wherein
when the first motor generator is driven as a motor, the controller performs field-strengthening control of the first motor generator.

10. The electric vehicle control apparatus according to claim 8, wherein
the input voltage of the first motor generator boosted by the boost circuit is a maximum possible voltage within a constraint of a maximum current suppliable to the first motor generator and within a constraint of a voltage to be applied to the first motor generator.

11. The electric vehicle control apparatus according to claim 10, wherein
the input voltage of the first motor generator boosted by the boost circuit is determined based on a target rotation speed of an internal combustion engine reversely driven by the first motor generator and power consumption by the first motor generator.

12. The electric vehicle control apparatus according to claim 8, wherein
whether to operate the first motor generator at the inefficient operating point is determined based on a magnitude of the regenerative power.

13. The electric vehicle control apparatus according to claim 8, further comprising
an internal combustion engine connected to the first motor generator to transmit power, wherein
the load of the first motor generator is the internal combustion engine when the regenerative power is used.

14. The electric vehicle control apparatus according to claim 8, further comprising:
an electricity storage device; and
a second motor generator driven with electric power supplied from at least one of the electricity storage device and the first motor generator, wherein
the regenerative power is supplied from the second motor generator during braking of the electric vehicle.

15. The electric vehicle control apparatus according to claim 8, wherein
the controller is configured to drive the first motor generator with regenerative power generated during braking of the electric vehicle without charging an electricity storage device.

16. The electric vehicle control apparatus according to claim 15, wherein
the controller is determined to drive the first motor generator with regenerative power in response to a determination that the electricity storage device cannot be charged.

17. A method of controlling an electric vehicle comprising:
controlling a first motor generator to drive a load with regenerative power supplied during braking of an electric vehicle;
boosting an input voltage to the first motor generator so as to expand an operable range of the first motor generator during braking of the electric vehicle; and
controlling the first motor generator to be driven at an inefficient operating point within the operable range of the first motor generator in a case where the first motor generator drives the load during braking of the electric vehicle.

18. The method of controlling an electric vehicle according to claim 17, wherein
the controlling the first motor generator to drive the load with regenerative power during braking of the electric vehicle is performed without charging an electricity storage device.

19. The method of controlling an electric vehicle control apparatus according to claim 18, wherein
the controlling the first motor generator to drive the load with regenerative power is performed in response to a determination that the electricity storage device cannot be charged.

* * * * *